Patented Mar. 12, 1940

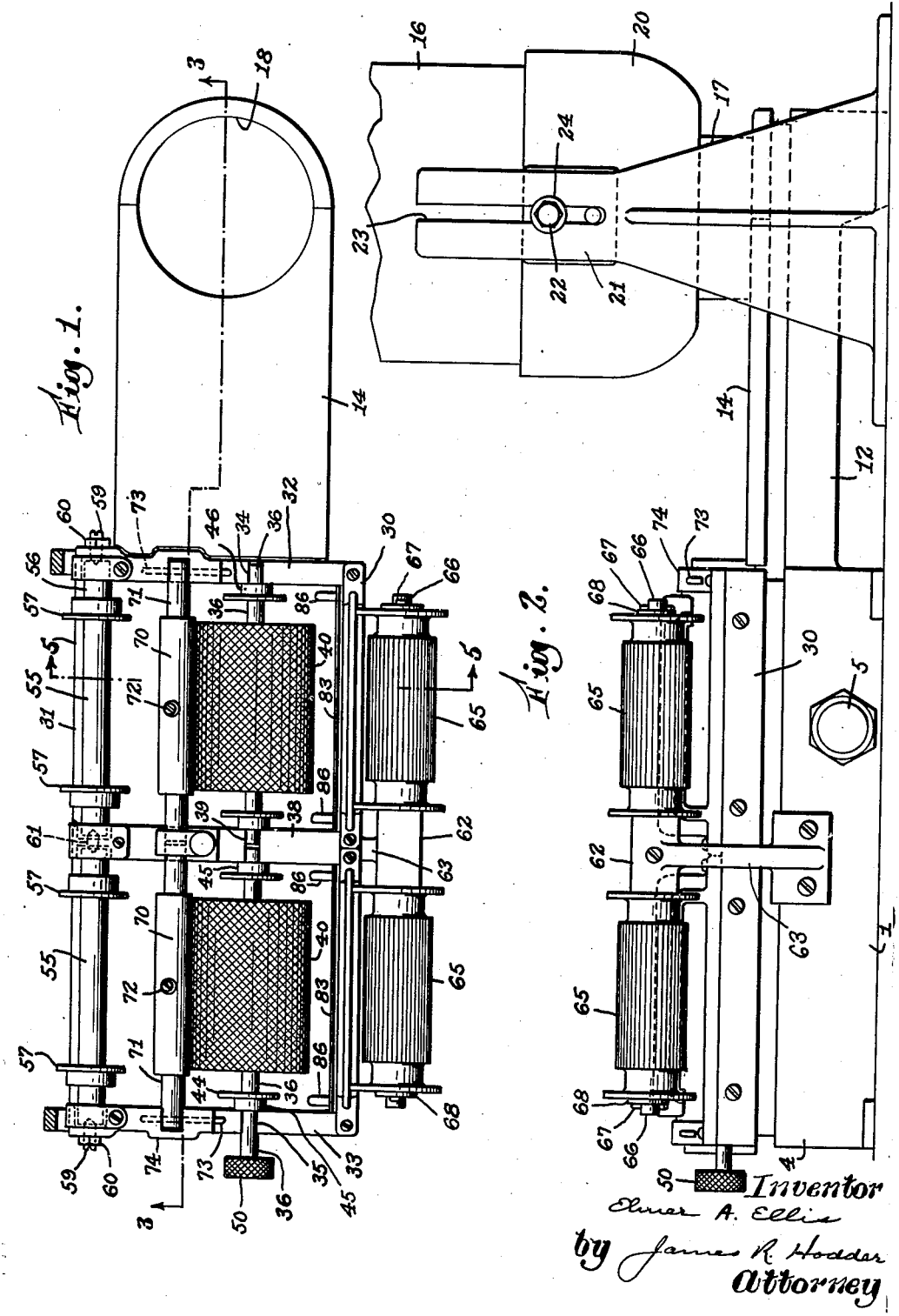

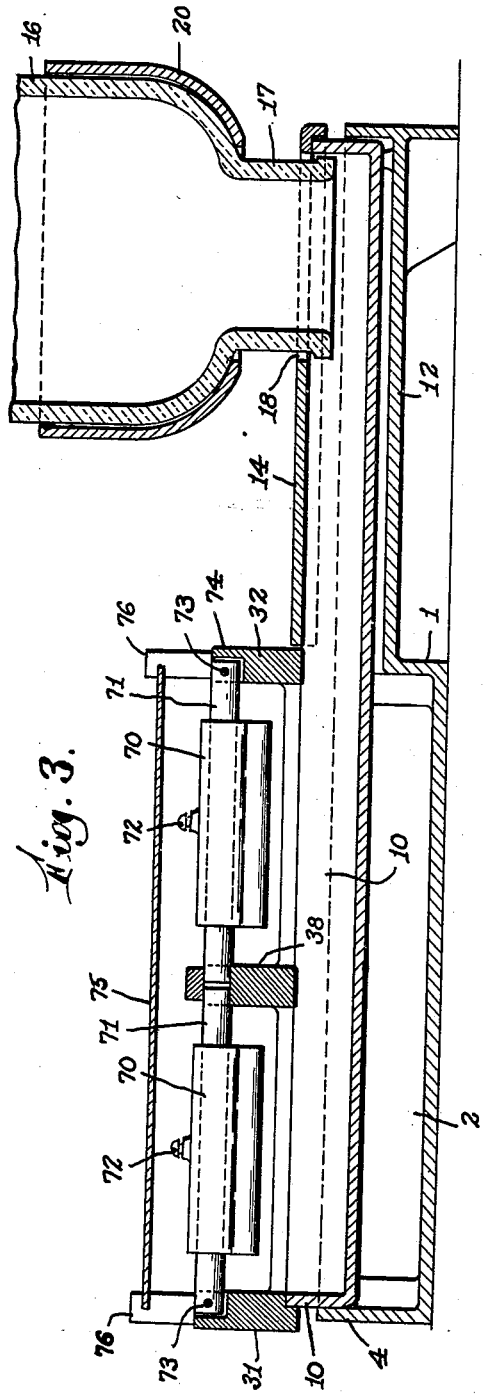
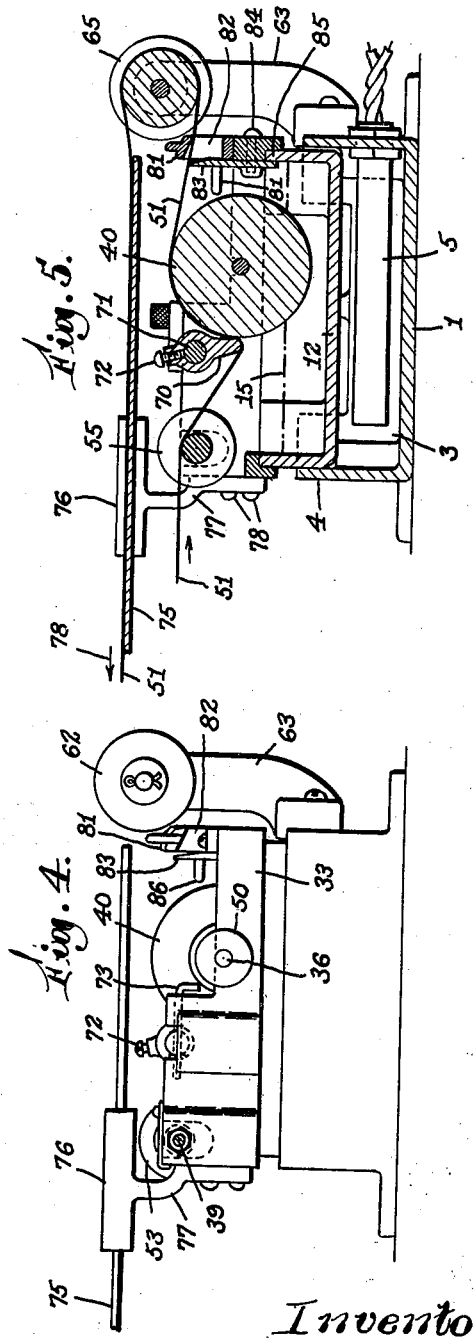

2,193,584

UNITED STATES PATENT OFFICE 2,193,584

GEMMING MACHINE

Elmer A. Ellis, Medford, Mass.

Application October 5, 1938, Serial No. 233,378

1 Claim. (Cl. 91—51)

My present invention is a novel and improved machine for coating, with adhesive, canvas, duck, or the like textile material, to be thereupon immediately applied to insoles for reinforcing the same.

The method or process of reinforcing insoles is generally known as gemming, and has heretofore been generally practiced in the trade either by utilizing a so-called hot process wherein a thermoplastic adhesive was heated and applied to the reinforcing fabric while thus hot, or by utilizing a rubber compound which would maintain its adhesiveness while cold or at "room temperature," and could be so applied both to the duck and then the coated duck applied to the insole while still cold.

My prior Patent No. 1,830,428 is illustrative of the "cold" process, and my prior Patent No. 2,101,987 is illustrative of the prior "hot" process.

In the methods of each of my said prior patents a continuous strip of reinforcing material is drawn thru the apparatus and suitable lengths cut therefrom by the operator to be applied to the side of insole to be reinforced. This prior method results, particularly when the heated process is employed, in permitting the operator to draw off a strip and cut a piece therefrom at a distance from the machine, thereby allowing the heated coating to cool somewhat, and thus impair the adhesive quality in the gemming operation.

In the prior "cold" method, this objection was not important but a special adhesive mixture was essential to carry out the "cold" process successfully, while when latex is employed, a predetermined degree of heat is most important for more efficient adhesion of the reinforcing of the insole. Thus, in my said prior Patent 1,830,428 a special compound of rubber cement was employed, which was expensive and difficult to mix evenly; whereas in my present invention I utilize a substantially pure latex which is most inexpensive and yet most efficient while heated.

In my present improved invention I utilize a substantially predetermined degree of heat, viz. 120° F. and employ a substantially pure latex solution for the adhesive coating, and can utilize unsized or previously sized and treated canvas for the reinforcing layer.

Preferably, I maintain a predetermined level of the latex in the apparatus so as to provide an even feeding of the heated liquid latex by means of a feeding roll on to the surface of the duck to be treated, and also provide means by which the coated duck can be immediately cut in suitable lengths while it is still in the machine and thus maintained at its most desirable heated state and immediately applied to the insole before the same has any chance to cool or set.

Thus I provide a much better and quicker union in the gemming operation between the reinforcing layer and the insole, and this also enables me to employ a much heavier coating of the heated latex, thereby affording a better holding of the material over the old "cold" or "hot" processes, as well also as securing quicker and better results.

An important feature of the present invention consists in the construction and arrangement whereby the axles of the feed rolls will be free of being gummed up by the adhesive. This has been a constant difficulty in prior machines and frequently required the stoppage of the machines for cleaning because the axles of the feed rolls and guides were gummed and coated by the adhesive being employed. I have eliminated this difficulty in the present machine, and provide novel guards for the axle bearings.

Referring to the drawings illustrating my present method and a preferred apparatus to carry out the present invention:

Fig. 1 is a plan view with the cutting support omitted;

Fig. 2 is a side elevational view;

Fig. 3 is a longitudinal cross-sectional view on the line 3—3 of Fig. 1;

Fig. 4 is an end view, and

Fig. 5 is a cross-sectional view on the line 5—5 of Fig. 1.

As shown in the drawings, I employ a simple machine, preferably of the duplex or double type, suitable for the treatment of two strips of material at the same time although a single strip machine may be as advantageously employed to carry out the invention.

In the drawings, I indicates a base preferably of metal, cast or stamped out, having a central opening or receptacle 2 to receive a quantity of water and an electrical immersion heating element 5. This base I is also formed to receive a removable trough-like member 10 which also constitutes a cover for the water-receiving area 2 in the base I fitting freely but snugly within the rim or flange 4 of the base I, as best shown in Figs. 3 and 4. Both the base I and the trough 10 are formed with extensions 12 and 14, respectively, at one side, viz., the right viewed in the drawings, to facilitate filling.

Lifting out the trough 10 permits filling of the lower receptacle 2 with water, and thereupon replacing the trough 10 permits the latex, indicated at the line or level 15, to be supplied in the trough 12 and kept at a normal level by inverting a bottle 16 with its neck 17 extending thru a corresponding opening 18 in the forward extension 14 in the trough 12 to thus supply the latex by barometric pressure. An adjustable support 20 adapted to receive and hold the lower portion of the bottle 16 is provided and this may be raised or lowered on a supporting standard 21 also formed on the forward end of the extension 12, with facility for raising and lowering and securing in adjusted position through tightening of an adjustable nut 22 carried at each side on trunnions on the support 20 passing thru grooves 23 on each standard 21 on opposite sides of the support 20, tightening same against a washer 24 which spans the groove 23, as clearly shown in Fig. 2. Thus an adjustable level of the latex can be maintained, which would be roughly coextensive with the bottom portion of the neck 17 extending in the extension 14 of the trough 10.

In order to eliminate the danger of the feed roll axles from becoming gummed with the adhesive in the machine, as well as to facilitate access to the interior of the trough carrying the adhesive, I have mounted the feed rolls and the guide rolls over which the strip of material is fed in a separate removable frame and at a substantial height and distance above the level of the latex in the trough.

For this purpose I provide an open framework consisting in sides 30 and 31 and end pieces 32 and 33, said end pieces having bearings as shown at 34 and 35, Fig. 1, for the axle 36 carrying the pair of feed rolls 40—40. Also, I provide an intermediate cross-brace 38 extending from one side frame 30 to the other side frame 31, in which is a bearing 39 for the axle 36 of the feed rolls. Around each end axle 36 adjacent these bearings I provide a flanged hub consisting of a circular flange 44 attached to the hub 45, which latter encircles the axle 36. These flanged guards thus protect the bearings of the feed rolls 40 from becoming gummed up thru adhesive which may fall or drop from the feed roll on to the axle 36 or from the material being coated and are a most important and desirable feature of my present machine.

I prefer to secure to the outer end of the axle 36 a thumb nut 50 so that the feed rolls 40 may be turned by hand to give a preliminary coating to the strip 51 when it is first threaded thru the machine or when starting up after a slight delay.

Guide rollers 55—55 are mounted in advance of each of the feed rolls 40, the strip of canvas to be coated being laid over these guide rolls, which are mounted on axes 56 secured in bearings in the side members 32 and 33 and the metal cross-bearing 38. Each guide wheel 55 is provided with guiding flanges 57 to retain the strip 51 in alignment with the feed roll 40.

In order to provide an anti-frictional, as well an adjustable, bearing for the feed rolls 55, I provide coned recesses in each end of the shaft 56 which are engaged by a correspondingly cone-shaped end of an adjusting screw 59 threaded thru tapped openings in the end frames 32 and 33. Locking nuts 60 will hold the adjusting screw bearings 59 in position at desired points. An intermediate cone bearing, in dotted lines at 61, in the intermediate cross-member 38 is provided. A pair of guide rolls at the opposite side of the machine are mounted in the bearing 62, carried by brackets 63, secured to the frame 1, see Figs. 2 and 5, on an axle 66. These guide rolls are retained in position by cotter pins 67 and washers 68 at each end, as best shown in Figs. 1 and 2.

In order to facilitate the feeding of the latex in the trough 12 onto the canvas strip 1, I prefer to provide an adjustable friction member 70 to cooperate with each feed roll 40. Each member 70 is mounted on a shaft 71 which passes thru a corresponding opening thru the upper part of the member 70 (see Fig. 5), and said member is adjustably secured on the shaft 71 by a set screw 72. The shafts 71 are mounted in suitable bearings in the end partitions 32 and 33 and in the middle partition 38, as shown in Fig. 3, and are secured against rotative action by a pin 73 passing thru each end and into recesses in the adjacent portion of the end frames which are recessed and raised slightly for this purpose, as indicated at 74.

Thus when the strip 51 is threaded thru the machine over a guide roll 55, and thence underneath the friction member 70, thence over the roll 40, and then around the opposite guide rolls 65, each member 70 can be rocked slightly on its shaft 71 and secured in adjusted position by tightening the set screw 72 so that the strip 51 will be held in relatively tight contact with a segment of each feed roll 40, the pulling of the strip 51 rotating the feed roll 40 and, hence, feeding up the latex from the trough 12 and coating the under surface of the strip 51.

In order to facilitate the operation of my present apparatus and to maintain the coated latex on the strip 51 in the heated condition for better adhesion to the insole when a section is cut and applied to such insole, I provide a table 75 which may be a metal plate extending over the top of the feed rolls, and said table 75 is slidably positioned in side holders 76—76 mounted on a bracket 77 secured to the removable top frame 33 by bolts 78; or the same may be attached in any other suitable manner.

Thus the strip 51 as it is threaded thru the machine and then pulled by the operator from the end, as indicated by the arrow 78, Fig. 5, has its coated surface uppermost and the operator, with a pair of scissors, can cut off a length sufficient to apply to the insole by clipping the strip 51 at or near the point where the strip 51 leaves the table 75 in its path of travel, see Fig. 5, whereupon the section so cut is applied to the insole and before such section has a chance to be materially cooled as it is cut while still in the machine and still laying on the plate 75, which plate soon becomes warm when the machine is in use as it covers the heated rolls and latex in the trough 12.

Thus, I am enabled to prevent any substantial cooling of the coated strip and greatly facilitate the gemming operation.

It is desirable to provide a stripper for the under surface of the coating 51 after it is passed over the roll 40, and for this purpose I provide a slotted member 81 of substantially greater length than the width of the strip 51, and thread the strip 51 thru the slot 82 in said member between the applying roll and the guide roll 65. In advance, I also attach to this member a stripper 83 adjustably clamped thereto by a bolt 84, which bolt also serves to hold the stripper on the flange of the trough 12 by engaging it between a depending portion and the lower end of the stripper 83, as indicated at 85, see Fig. 5. Handles 86 at each end of the stripper enable the same to be readily raised and lowered when threading thru the strip 51 and then permitting raising of the stripper 83 into operative position in contact with the lower and coated surface.

I claim:

In a machine for coating textile material with adhesive for reinforcing insoles, a receptacle to hold adhesive, means to maintain the supply of adhesive in said receptacle at a substantially predetermined level, means to heat said adhesive to substantially a predetermined temperature, a feed-roll partially immersed in said adhesive, means to guide said textile material over a predetermined area of said feed-roll, flanges on said guide rolls to control the path of feed of said material, and flanges on said feed-roll to protect the feed-roll bearing and to adjust said feed-roll relatively with the material being fed over same, in combination with the adjustable tension member to hold the material in adjusted frictional engagement with the feed-roll and simultaneously predetermine the area of contact between the feed-roll and material.

ELMER A. ELLIS.